United States Patent
Kang et al.

(10) Patent No.: US 11,416,095 B2
(45) Date of Patent: Aug. 16, 2022

(54) TOUCH SCREEN CONTROLLER FOR DETERMINING RELATIONSHIP BETWEEN A USER'S HAND AND A HOUSING OF AN ELECTRONIC DEVICE

(71) Applicants: STMicroelectronics Asia Pacific Pte Ltd, Singapore (SG); STMicroelectronics (Beijing) R&D Co. Ltd, Beijing (CN)

(72) Inventors: Tae-gil Kang, Seoul (KR); Hang Yin, Beijing (CN); Cam Chung La, Singapore (SG)

(73) Assignees: STMicroelectronics Asia Pacific Pte Ltd, Singapore (SG); STMicroelectronics (Beijing) R&D Co. Ltd, Beijing (CN)

( * ) Notice: Subject to any disclaimer, the term of this patent is extended or adjusted under 35 U.S.C. 154(b) by 1199 days.

(21) Appl. No.: 15/151,247

(22) Filed: May 10, 2016

(65) Prior Publication Data

US 2017/0308220 A1    Oct. 26, 2017

(30) Foreign Application Priority Data

Apr. 26, 2016 (CN) .................. 201610266876.X

(51) Int. Cl.
  *G06F 3/041* (2006.01)
  *G06F 3/044* (2006.01)
(52) U.S. Cl.
  CPC .......... *G06F 3/0416* (2013.01); *G06F 3/044* (2013.01); *G06F 3/0446* (2019.05); *G06F 3/04166* (2019.05)

(58) Field of Classification Search
  CPC .................................................... G06F 3/0416
  See application file for complete search history.

(56) References Cited

U.S. PATENT DOCUMENTS

| | | | | |
|---|---|---|---|---|
| 2011/0148915 A1* | 6/2011 | Kim | ...... | G06F 1/1626 345/619 |
| 2011/0261007 A1* | 10/2011 | Joharapurkar | ........ | G06F 3/0418 345/174 |
| 2012/0075220 A1* | 3/2012 | Matsui | .................. | G06F 3/0416 345/173 |
| 2013/0033434 A1* | 2/2013 | Richardson | ........... | G06F 3/0488 345/173 |
| 2014/0351768 A1* | 11/2014 | Park | ...................... | G06F 3/0488 715/856 |

\* cited by examiner

*Primary Examiner* — William Boddie
*Assistant Examiner* — Andrew B Schnirel
(74) *Attorney, Agent, or Firm* — Crowe & Dunlevy

(57) ABSTRACT

An electronic device described herein includes a touch screen for a touch sensitive display carried by a portable housing. The electronic device is configured to operate in a high detection threshold mode to determine whether an object is in contact with the touch sensitive display, and operate in a low detection threshold mode to determine whether the object is adjacent to the touch sensitive display, based on lack of detection of the object being in contact with the touch sensitive display. The electronic device is further configured to determine whether the object is in contact with a peripheral edge of the portable housing by determining whether the object is adjacent opposite sides of the touch sensitive display, based on detection of the object being adjacent to the touch sensitive display.

26 Claims, 12 Drawing Sheets

TOUCH SCREEN CONTROLLER FOR DETERMINING RELATIONSHIP BETWEEN A USER'S HAND AND A HOUSING OF AN ELECTRONIC DEVICE

PRIORITY CLAIM

This application claims priority from Chinese Application for Patent No. 201610266876.X filed Apr. 26, 2016, the disclosure of which is incorporated by reference.

TECHNICAL FIELD

The present disclosure relates generally to touch screens and more specifically to techniques for determining a relationship between a user's hand and a housing of an electronic device.

BACKGROUND

Touch screens are present in many different types of common modern electronic devices, such as smartphones, tablets, smartwatches, wearables, laptop computers, and so on. In these electronic devices the touch screen serves as an output device as well as an input device. The touch screen typically includes display layer and a sensing layer. A touch screen controller is coupled to the sensing layer and operates to process signals therefrom to detect inputs by a user. The sensing layer includes touch sensors, and is attached to or formed as an integral part of the display layer, which may be a LCD, IPS, or AMOLED display, for example.

A typical sensing layer of a touch screen is a capacitive sensor array including a number of force or drive lines and orthogonally arranged sense lines. These lines are made from suitable conductive materials, the drive lines are formed on one sub-layer of the sensing layer and the sense lines formed on another sub-layer, with these sub-layers being separated by a transparent insulating material such as an insulating dielectric layer. The overlap of the drive lines and the orthogonally arranged sense lines with the insulating material between forms an array of capacitive sensors. In operation, a drive signal, which is typically a periodic waveform such as a pulse train, is applied successively to the drive lines. As the drive signal is applied to a given drive line, the capacitive coupling between that drive line and the sense lines results in capacitive coupling of the drive signal to the sense lines to thereby generate sense signals on the sense lines responsive to the drive signal.

The value of the sense signal generated on each sense line is a function of the capacitive coupling between that sense line and the drive line receiving the drive signal. This capacitive coupling changes in response to a user's hand being proximate the sensor nodes formed at the overlap of the drive and sense lines. This change in capacitive coupling of the drive signal to the sense lines will result in a change in the sense signal generated on the sense lines, and in this way the sense signals indicate whether a user's finger or other touch device is adjacent a given sensor node in the touch panel.

In operation, a user touches a surface of the touch panel or hovers his or her finger above the touch panel, and the capacitive sensors generate corresponding electronic sensor signals that are provided to the touch screen controller. From these sensor signals, the touch screen controller determines touch data values (referred to as strength values), from these strength values determines the type of touch event or hover event input by the user to the touch screen, and then provides this information to processing circuitry, such as a host controller, in the electronic device.

As devices incorporating touch screens grow more complex in functionality provided, the providing of additional input paradigms to a user is desirable. Since users are now accustomed to using touch based interfaces, it is desirable to develop new ways of using the capacitive sensors in a touch panel to form new user interface paradigms, and also to provide information about the way the user is interfacing with the device (i.e. holding the device, laying the device flat on a surface, etc.) to the processing circuitry.

SUMMARY

An electronic device described herein includes a touch screen for a touch sensitive display carried by a portable housing. The electronic device is configured to operate in a high detection threshold mode to determine whether an object is in contact with the touch sensitive display, and operate in a low detection threshold mode to determine whether the object is adjacent to the touch sensitive display, based on lack of detection of the object being in contact with the touch sensitive display. The electronic device is further configured to determine whether the object is in contact with a peripheral edge of the portable housing by determining whether the object is adjacent opposite sides of the touch sensitive display, based on detection of the object being adjacent to the touch sensitive display.

Another aspect is directed to an electronic device including a portable housing with a touch sensitive display carried by the portable housing, the touch sensitive display including a plurality of sense lines. A touch screen controller is coupled to the plurality of sense lines and configured to operate in a screen touch detection mode to detect a user's hand being in contact with the touch sensitive display as a function of reading strength values from at least some of the plurality of sense lines. In the screen touch detection mode, the user's hand is detected as being in contact with the touch sensitive display as a function of read strength values being greater than a first threshold.

The touch screen controller is configured to operate in a portable housing touch detection mode to detect the user's hand being adjacent to the touch sensitive display, based on lack of detection of the user's hand being in contact with the touch sensitive display and as a function of reading strength values from at least some of the plurality of sense lines. In the portable housing touch detection mode, the user's hand is detected as being adjacent to the touch sensitive display as a function of read strength values being greater than a second threshold, where the second threshold is less than the first threshold. The touch screen controller is also configured to determine whether the user's hand is in contact with the portable housing by detecting whether the user's hand is adjacent opposite sides of the touch sensitive display, based on detection of the user's hand being adjacent to the touch sensitive display.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
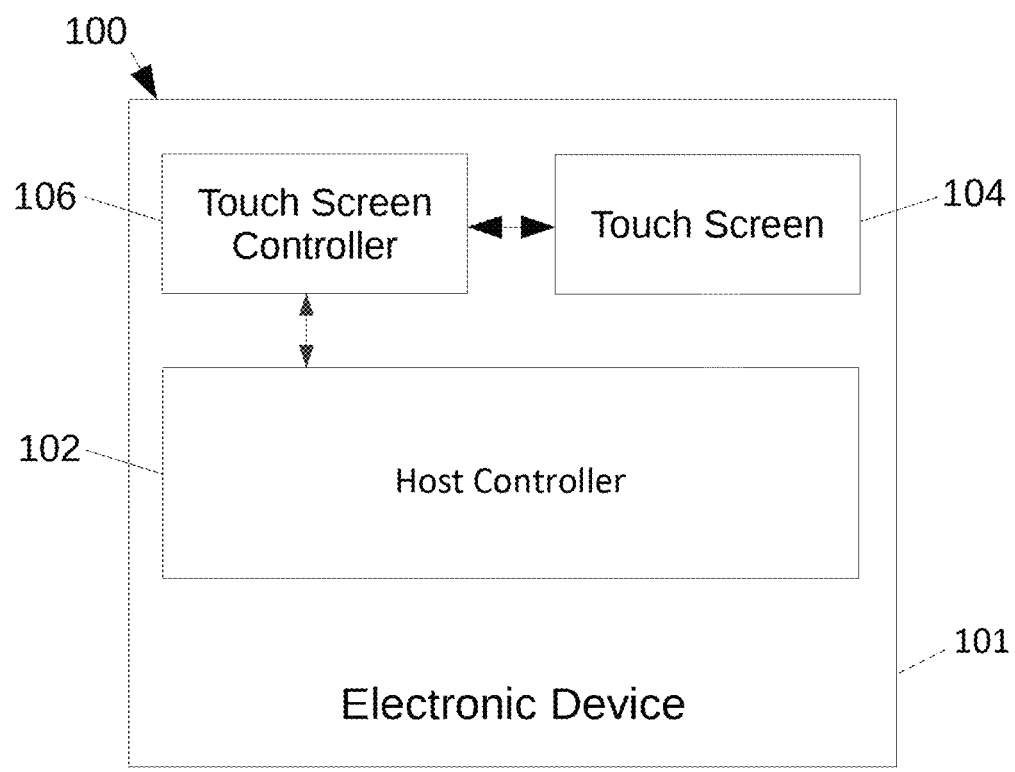
FIG. 1 is a block diagram of an electronic device on which the techniques described herein may be implemented.
Figure 2:
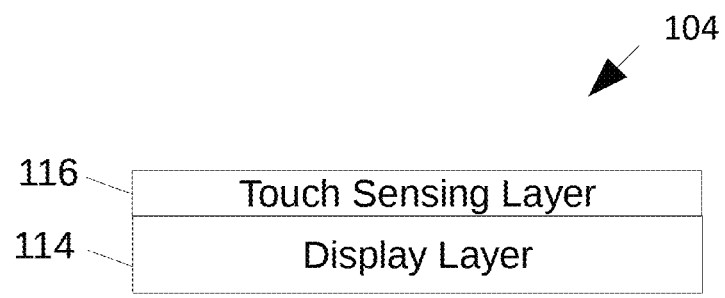
FIG. 2 is a cutaway view of the touch sensitive display of the touch screen of FIG. 1 showing the components thereof.
Figure 3:
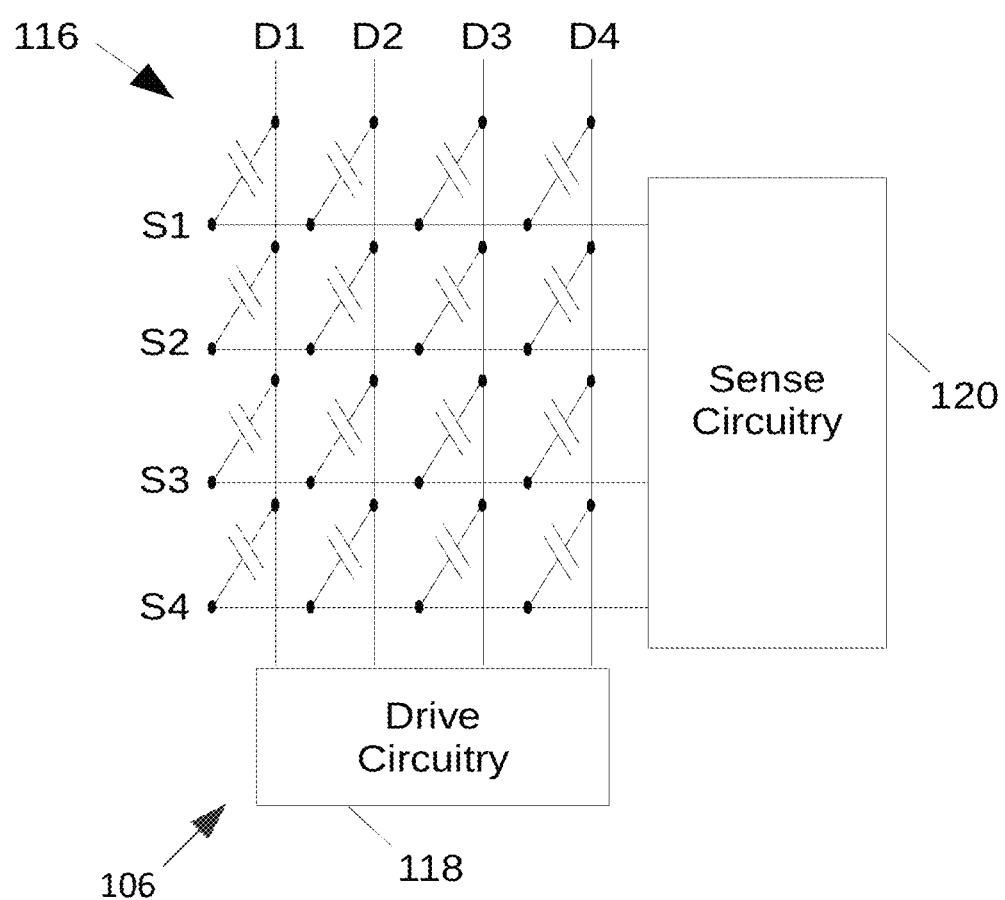
FIG. 3 is a schematic block diagram of the touch screen controller of FIG. 1, and its interconnection with the sense and drive lines of the touch sensing layer of the touch sensitive display of FIG. 2.

With initial reference to FIGS. 1-3 an electronic device 100 is now described. The electronic device 100 may be a smartphone, smartwatch, wearable, tablet, laptop, or other suitable portable electronic device. The electronic device 100 includes a host controller 102 that receives input from a touch screen controller 106, which itself receives input from a touch screen 104. The output provided by the touch screen controller 106 to the host controller 102 as input includes information such as locations of touches on the touch screen 104, whether the touch screen 104 was tapped and where, the location and type of gesture performed on the touch screen 104, etc.

The touch screen 104 includes a display layer 114, with a touch sensing layer 116 adjacent thereto. The touch sensing layer 116 includes drive lines D1-D4 that intersect sense lines S1-S4 at some locations. The sense lines S1-S4 are coupled to the touch screen controller 106, while the drive lines D1-D4 are coupled to drive circuitry 118. At each intersection point between the drive line D1 and the sense lines S1-S4, a capacitance is formed.

In operation, the driving circuitry 118 drives the drive lines D1-D4 with periodic signals, such as sine waves or square waves. At certain intersection points between the drive lines D1-D4 and the sense lines S1-S4, touch sensors are formed, the respective sense line S1-S4 incurs a charge injection proportional to the voltage at the drive lines D1-D4, and a capacitance between the respective sense line S1-S4 and the drive lines D1-D4 is at the sensor of that intersection point. These capacitances vary in proximity to conductive objects, such as human fingers and styluses, and are measured by the touch screen controller 106 and processed to be touch data values stored in a matrix having entries that correspond to the various intersections of the drive lines D1-D4 with the sense lines S1-S4.

In some scenarios, it may be desirable for the host controller 102 to receive information regarding the relationship between the user's hand and the portable housing 101 of the electronic device 100. To that end, the touch screen controller 106 of this disclosure is capable of operating in a high detection threshold mode and a low detection threshold mode. In the high detection threshold mode, the strength measurement on a sense line that results in the registering of a touch is greater than the strength measurement on a sense line that results in the registering of a touch in the low detection threshold mode. Stated another way, in the low detection threshold mode, the gain or sensitivity of the touch screen controller 106 is increased so as to enable detection of the user's hand (or stylus, in some applications) in contact with the portable housing 101 but not with the touch screen 104; in the high detection threshold mode, the gain or sensitivity is decreased as to enable precise detection of the location of a touch of the user's hand on the touch screen 104.

Figure 4:
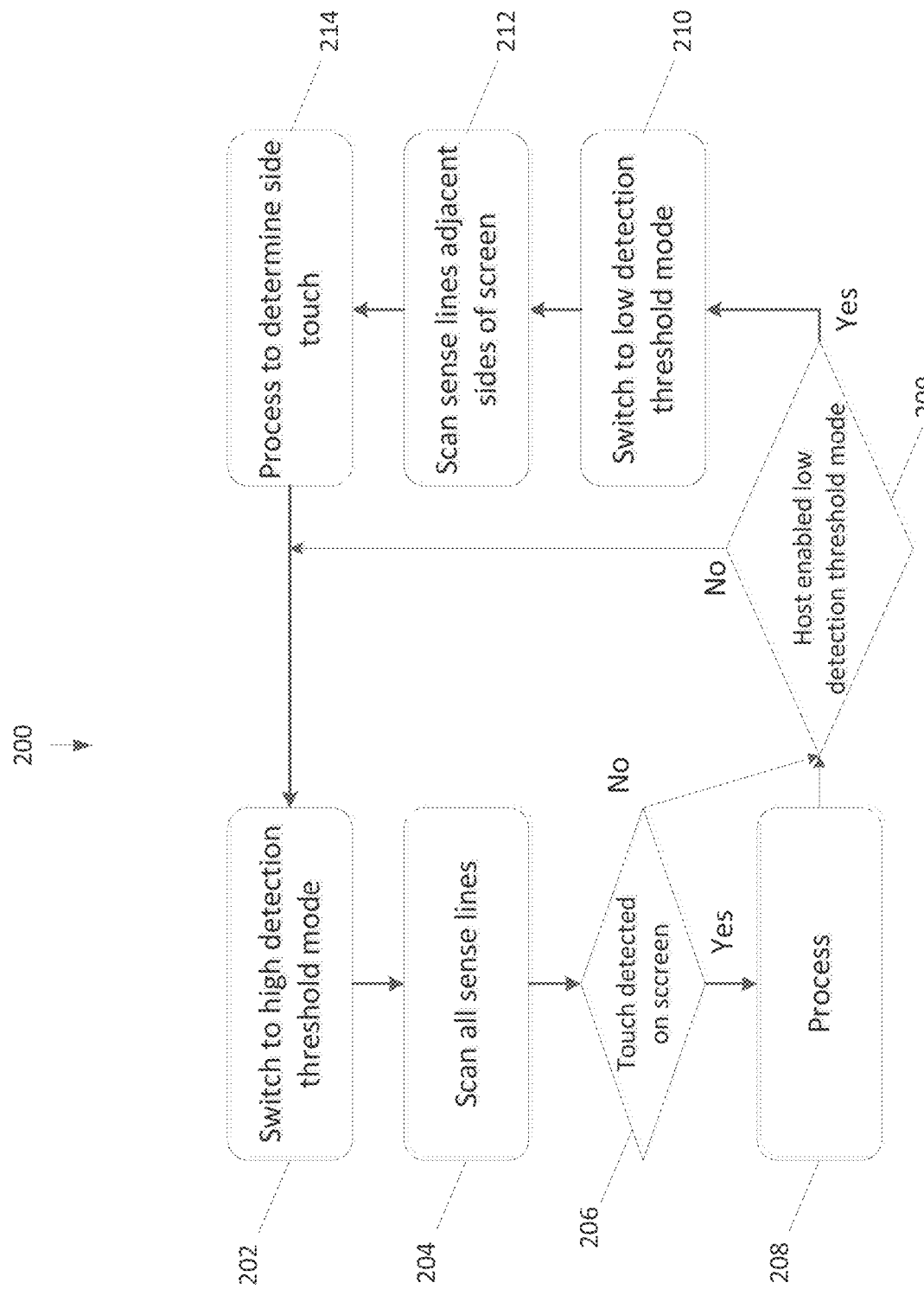
FIG. 4 is a flowchart describing operation of techniques for determining the relationship between a user's hand and a portable housing of an electronic device such as that shown in FIG. 1, in accordance with this disclosure.

Operation of this touch screen controller 106 will now be described with initial reference to FIG. 4. Here, the touch screen controller 106 enters the high detection threshold mode with a decreased gain/sensitivity (Block 202), and then scans the sense lines S1-S4 (Block 204) for strength values. Where a touch is detected (Block 206), the touch screen controller then processes those strength values (Block 208) and ultimately generates data for use by the host controller 102. Where a touch is not detected, the host controller 102 causes the touch screen controller 106 (Block 209) to enter into a low detection threshold mode with an increased gain/sensitivity (Block 210).

Once in the low detection threshold mode, the touch screen controller 106 then scans one or more sense lines S1, S4 adjacent the sides of the touch screen 104 (Block 212), but does not scan sense lines S2, S3 that are not adjacent the sides of the touch screen 104. The touch screen controller 106 then processes the resulting strength values to determine whether a touch to the side of the portable housing 101 of the electronic device 100 has been made (Block 214). That information is then passed to the host controller 102, and the touch screen controller 106 then returns to the high detection threshold mode (Block 202). This described process then repeats.

It should be noted that in some cases in the low detection threshold mode, the touch screen controller 106 drives one or more of the force lines D1, D4 adjacent the sides of the touch screen 104 instead, but does not drive force lines D2, D3 that are not adjacent the sides of the touch screen. The touch screen controller 106, in this mode, scans each sense line S1-S4. The touch screen controller 106 then processes the resulting strength values to determine whether a touch to the side of the portable housing 101 of the electronic device 100 has been made (Block 214). That information is then passed to the host controller 102, and the touch screen controller 106 then returns to the high detection threshold mode (Block 202). This described process then repeats.

Thus, as has been described, the touch screen controller 106 switches back and forth between the high detection threshold mode and the low detection threshold mode. It should be understood that the touch screen controller 106 may spend equal amounts of time (or clock cycles) in each of these modes, or may spend more time (or clock cycles) in one mode than in another mode.

By analyzing the strength values obtained when the user's hand is adjacent to but not touching the touch screen 104, the touch screen controller 106 or host controller 102 can determine whether the user is gripping the portable housing 101, whether the user has tapped the portable housing 101, or whether the user has performed a gesture on the portable housing 101.

Before this stage of the analysis or processing is performed though, it may be helpful to determine whether the user's hand is actually in contact with the portable housing 101, or whether the user is hovering a finger over the touch screen 104.

Figure 10:
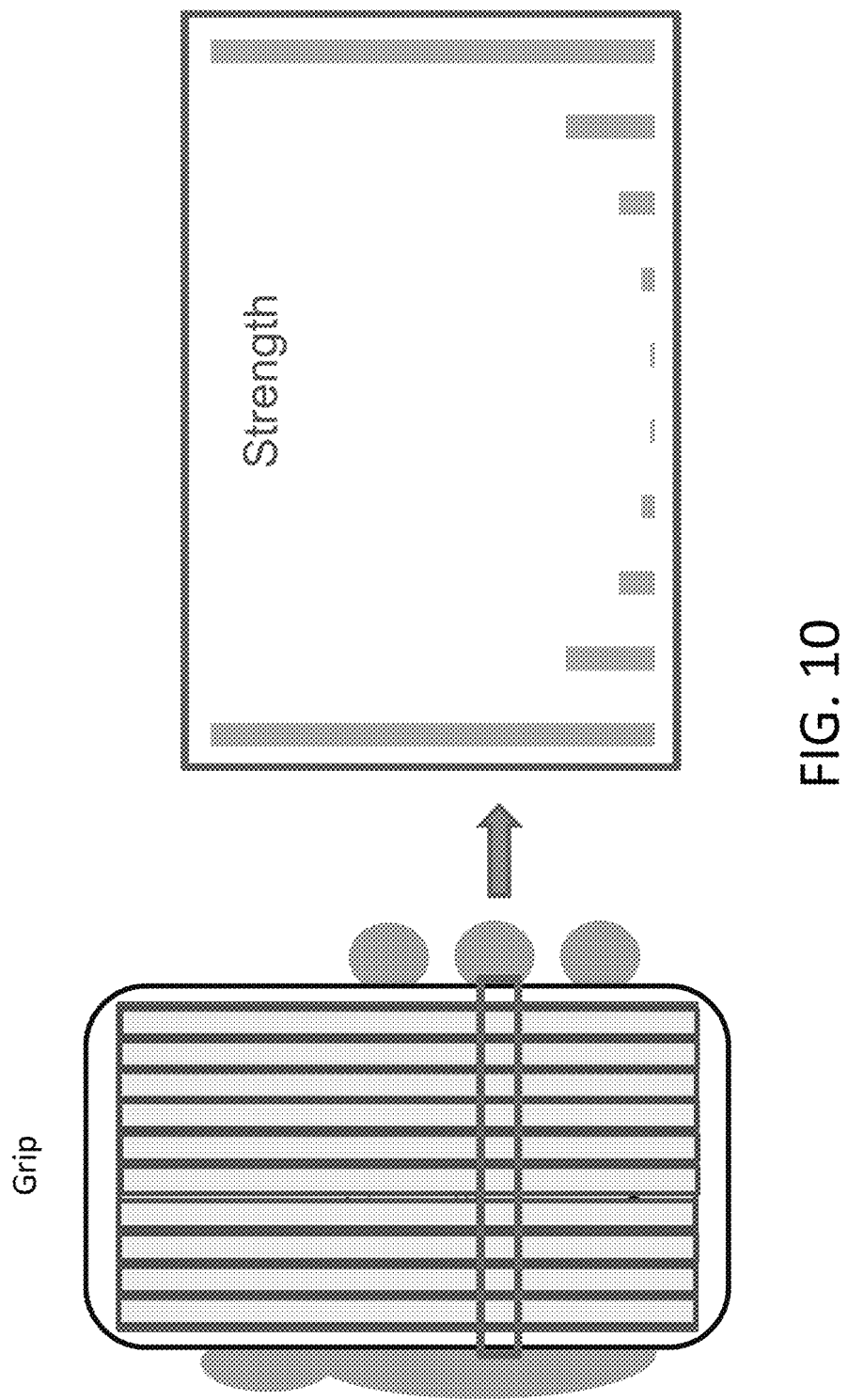
FIG. 10 illustrates the profile of strength values determined from the sense lines of the electronic device when a user is gripping the portable housing of the electronic device.
Figure 11:
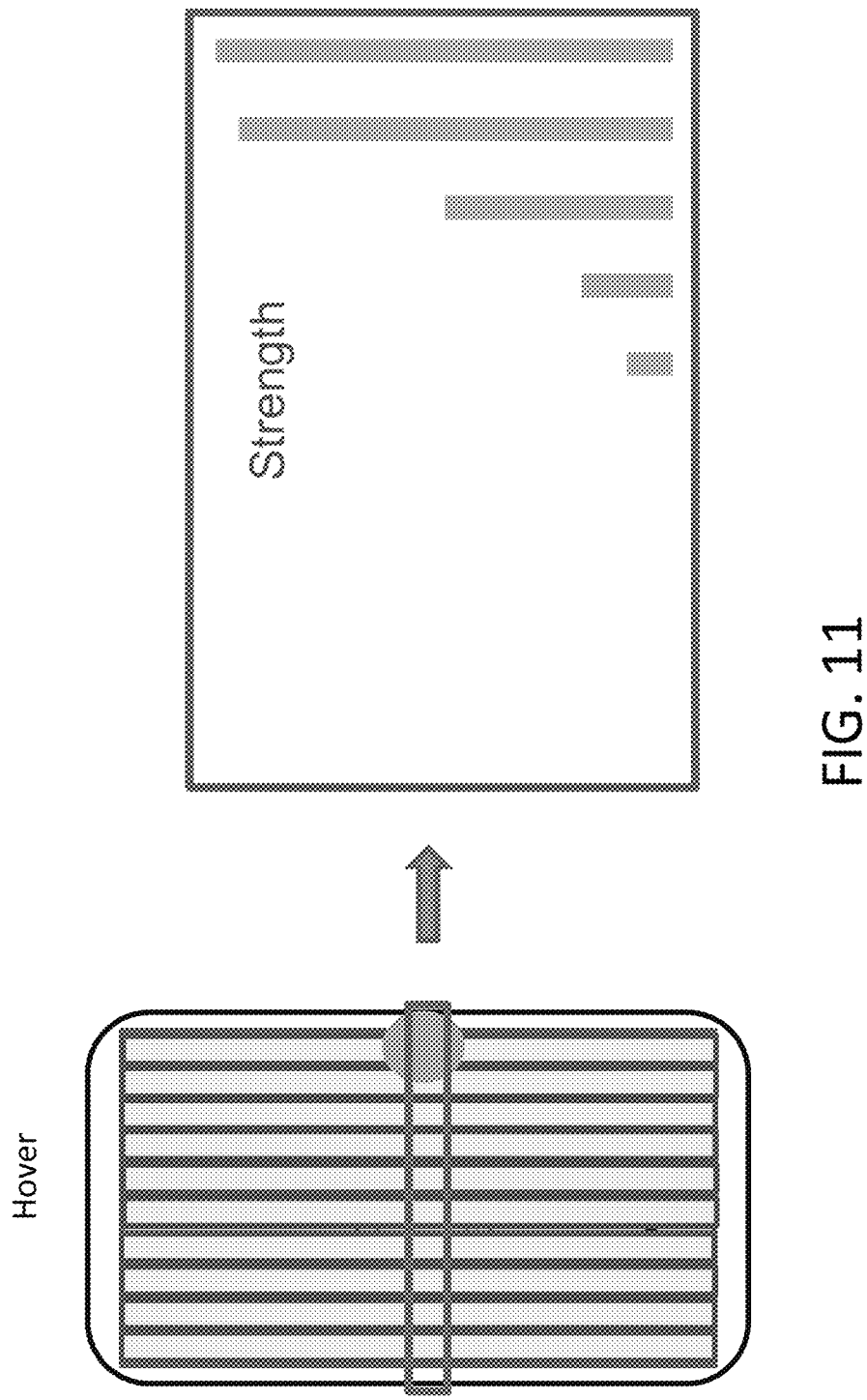
FIG. 11 illustrates the profile of strength values determined from the sense lines of the electronic device when a user is hovering a finger over the touch screen of the electronic device.

As can be seen on FIG. 10, when gripping the portable housing 101, the user is typically gripping on opposing sides, which results in the illustrated strength profile. However, when the user is merely hovering a finger over the touch screen 104, the resulting strength profile is as shown in FIG. 11. By determining which strength profile is read by the touch screen controller 106, the difference between a grip and a hover can thereby be determined.

Figure 12:
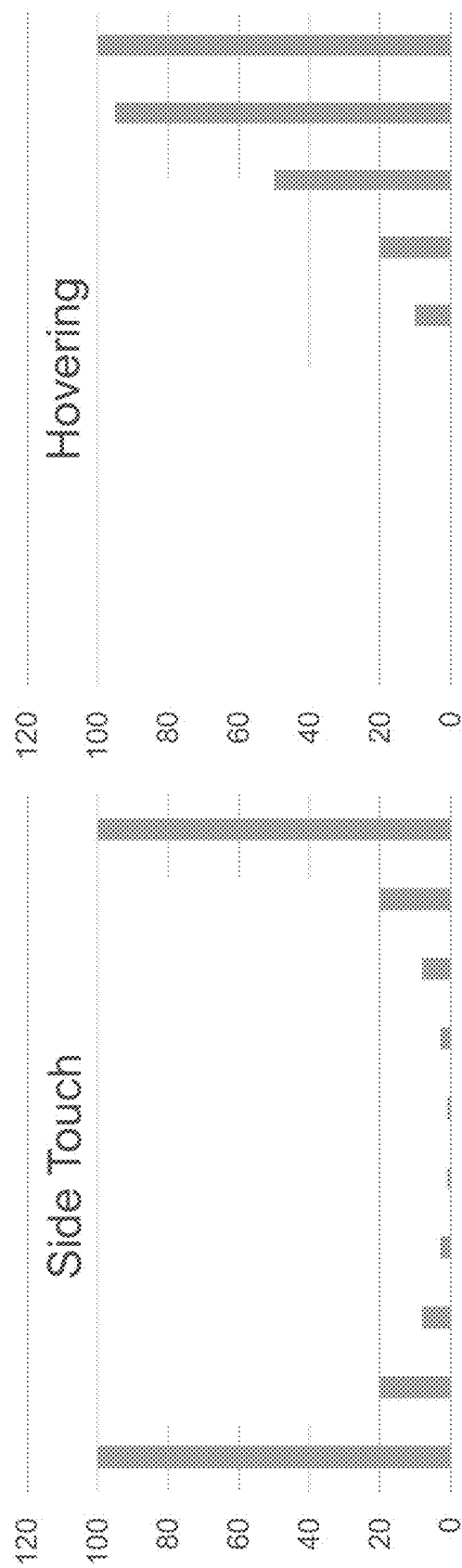
FIG. 12 illustrates a first technique for determining whether a user is gripping the portable housing of the electronic device or whether the user is hovering a finger over the touch screen of the electronic device.

One way to make the determination of which strength profile the readings of the sense lines S1-S4 best fits is by comparing the strengths of the two sense lines most adjacent a given side (or in the case where all sense lines S1-S4 are read but not all force or drive lines D1-D4 are driven, the reading of each sense line when two drive lines most adjacent the given side are activated). If the strength of the sense line most adjacent a given side (or the strength of each sense line when the drive line most adjacent the given side is activated) is above a given threshold (as shown in FIG. 12, value 80), and the strength of the sense line adjacent that sense line (or the strength of each sense line when the drive line adjacent the drive line most adjacent the given side is activated) is below a given threshold (as shown in FIG. 12, value 50), and this strength remains for a given period of time, the touch screen controller 106 or host controller 102 can determine that the user is gripping the portable housing 101 of the electronic device 100.

Likewise, if the strength of the sense line most adjacent a given side (or the strength of each sense line when the drive line most adjacent the given side is activated) is above a given threshold and the strength of the sense line adjacent that sense line (or the strength of each sense line when the drive line adjacent the drive line most adjacent the given side is activated) is below a given threshold, and if a similar pattern is present for the opposite side, then the touch screen controller 106 or host controller 102 can determine that the user is gripping the portable housing 101 of the electronic device 100. However, if the strength of the two sense lines (for example, S3-S4) is similar (or if the strength of each sense line as two drive lines are activated), with both being above their respective thresholds, then the touch screen controller 106 or host controller 102 can determine that the user is hovering a finger over the touch screen 104.

Figure 13:
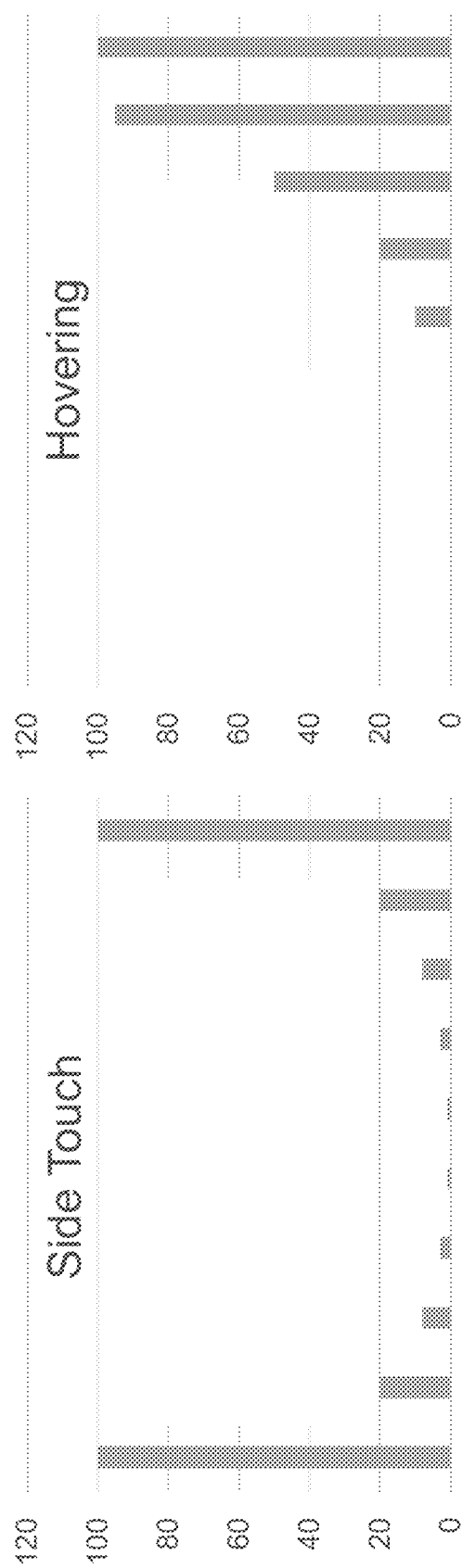
FIG. 13 illustrates a second technique for determining whether a user is gripping the portable housing of the electronic device or whether the user is hovering a finger over the touch screen of the electronic device.

Rather than having the second threshold be a set value, the second threshold may instead be a set percentage of a maximum possible strength reading of the sense line most adjacent the side of the touch screen 104, as shown in FIG. 13.

In either case, where a hover is detected, data values representing the location of the hovering finger over the touch screen 104 may be determined by the touch screen controller 106 and sent to the host controller 102. Alternatively, these data values may not be sent.

Figure 5:
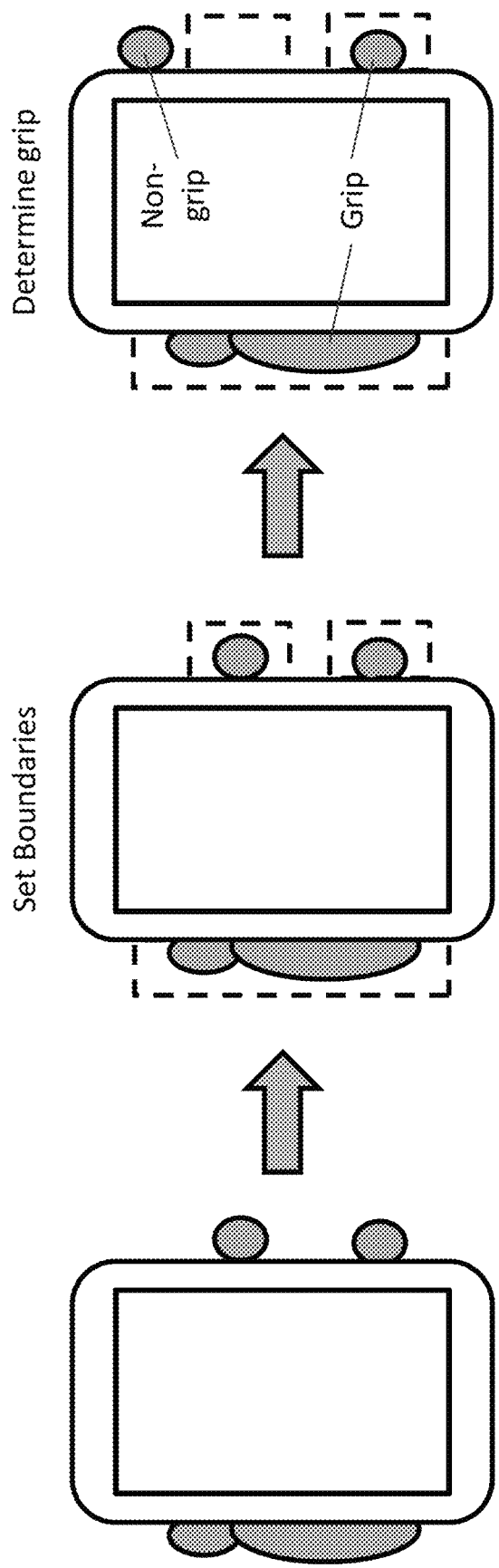
FIGS. 5A-5C illustrate a first technique for determining that a user's hand is gripping the portable housing of the electronic device.

With reference to the series shown in FIGS. 5A-5C, a first technique for determining that a user is gripping the portable housing 101 of the electronic device 100 is now described. Here, once the touch screen controller 106 detects strength values of the sense lines that could indicate that a user's hand is gripping the portable housing 101 (FIG. 5A), it defines boundaries about the locations where those strength values indicate parts of the user's hand may be (FIG. 5B). If those parts of the hand stay within those boundaries for a given period of time, then the fact that the user is gripping the portable housing 101 is determined (FIG. 5C).

Figure 6:
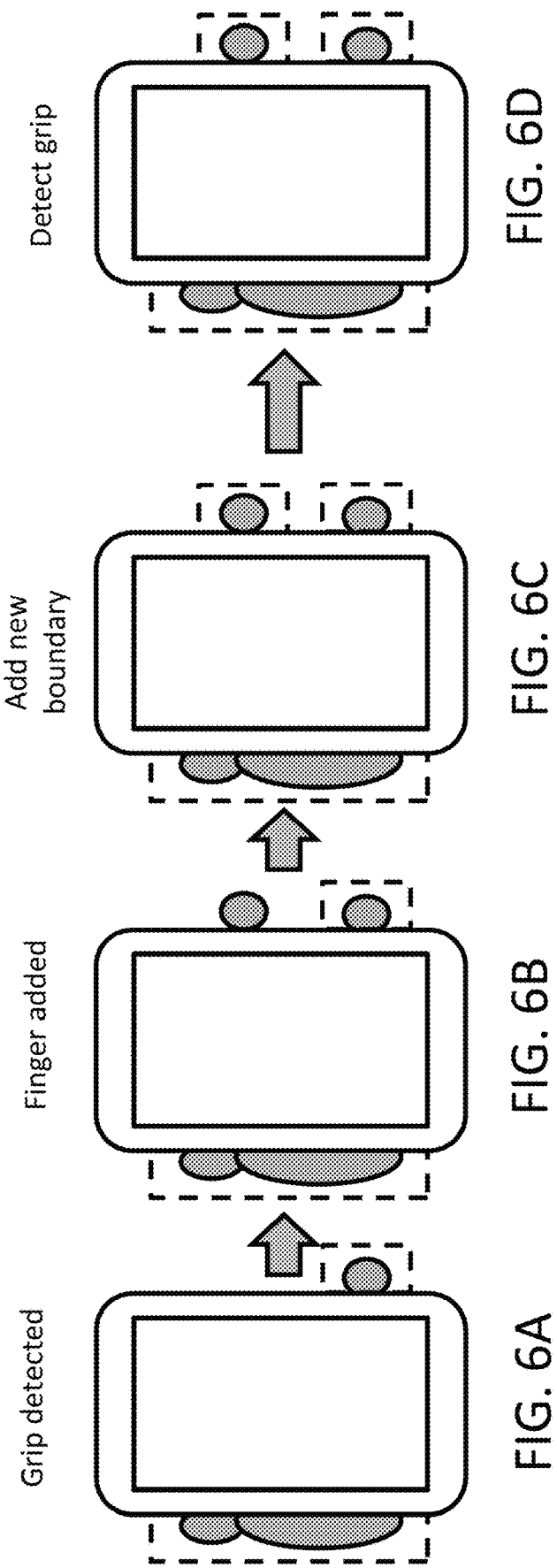
FIGS. 6A-6D illustrate a technique for determining that a user's hand is gripping the portable housing of the electronic device where the user initially grips the housing with two fingers, and thereafter adds another finger to the grip.

In some cases, the user may initially grip the portable housing 101 with a first number of fingers, and then later add one or more fingers to the grip. Such a scenario is depicted in the series shown in FIGS. 6A-6D, where the user initially grasps the portable housing 101 with a first set of fingers (FIG. 6A), then later adds another finger (FIG. 6B). In this case, the touch screen controller 106 may then define a new boundary for the newly added finger (FIG. 6C), and if that newly added finger stays within the new boundary for a given period of time, then the grip detection may change to be a grip that includes the newly added finger (FIG. 6D).

Figure 7:
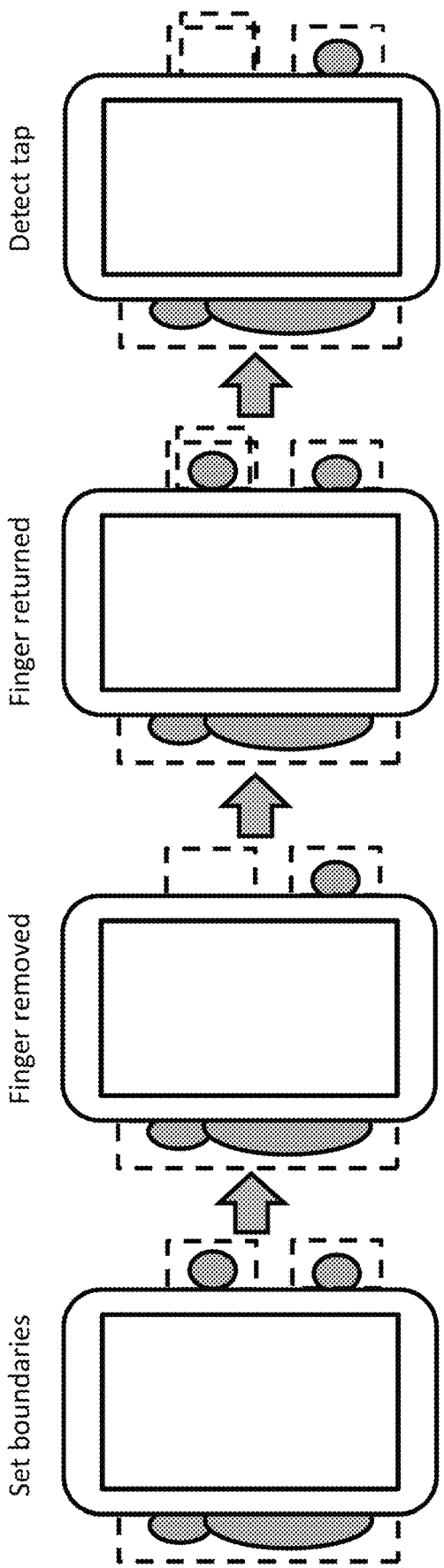
FIGS. 7A-7D illustrate a first technique for detecting that a user has tapped the portable housing of the electronic device.

Tap detection is now described with reference to the series shown in FIGS. 7A-7D. Here, once the touch screen controller 106 detects strength values of the sense lines that could indicate that a user's hand is gripping the portable housing 101, it defines boundaries about the locations where those strength values indicate parts of the user's hand may be (FIG. 7A). If a finger is removed from within one of these boundaries (FIG. 7B), and then returned to the proper boundary for a given period of time (FIG. 7C), and then removed from that boundary again, a tap is detected (FIG. 7D). In some applications, the boundary for detection of a tap may be different than the boundary for grip detection.

Figure 8:
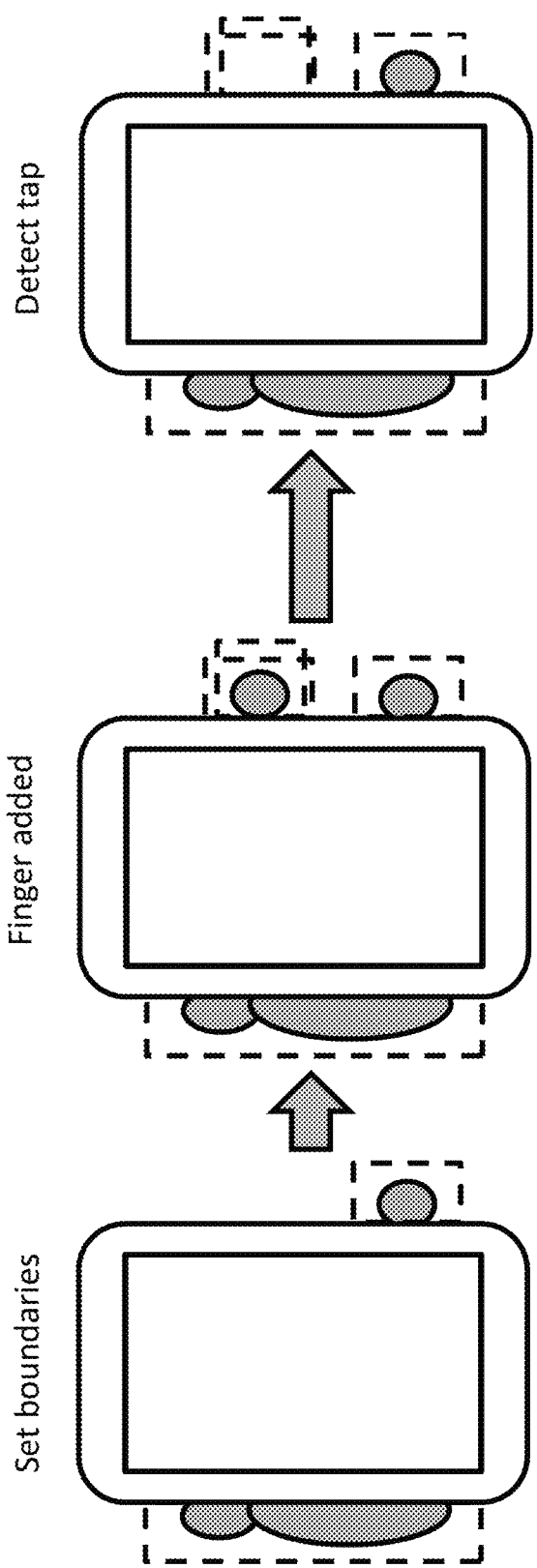
FIGS. 8A-8C illustrate a second technique for detecting that a user has tapped the portable housing of the electronic device.

Another technique for tap detection is described with reference to the series of FIGS. 8A-8C. Here, once the touch screen controller 106 detects strength values of the sense lines that could indicate that a user's hand is gripping the portable housing 101, it defines boundaries about the locations where those strength values indicate parts of the user's hand may be (FIG. 8A). If a finger is then added as indicated by strength values, the touch screen controller 106 adds a boundary for the added finger (FIG. 8B). If that finger is present for a given period of time, and then it leaves the side, a tap or side tap is detected (FIG. 8C).

Figure 9:
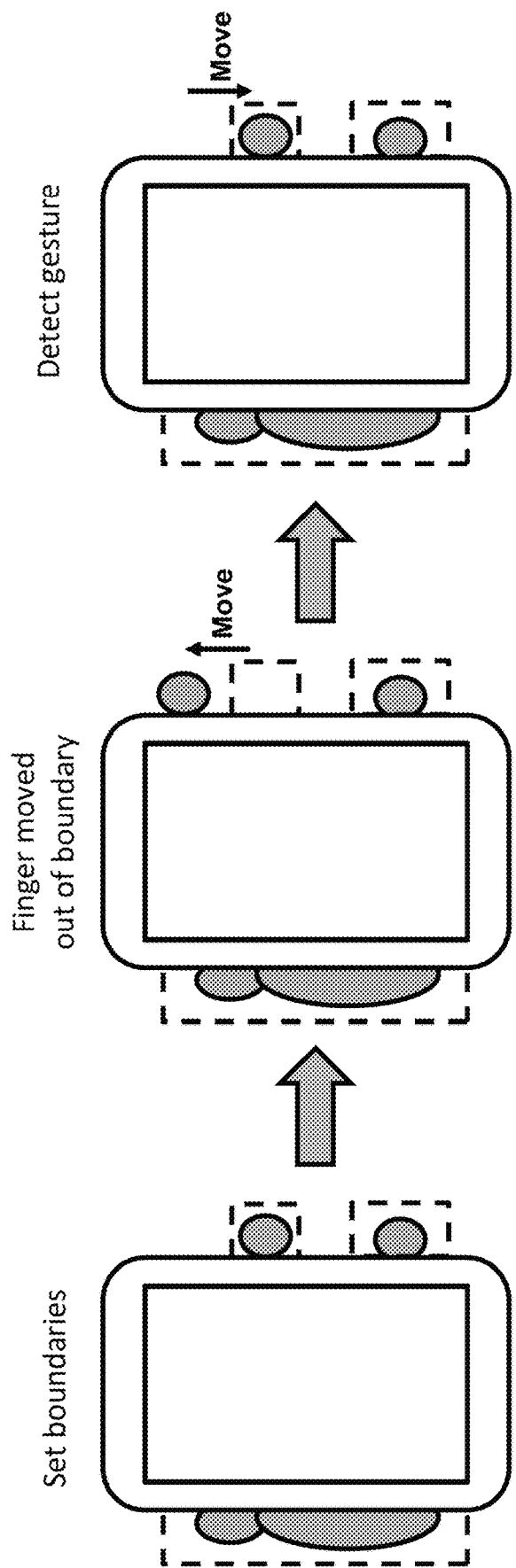
FIGS. 9A-9C illustrate a technique for detecting that a user has performed a gesture on the portable housing of the electronic device.

As explained above, gesture detection may also be performed by the touch screen controller 106. This is now described with reference to the series shown in FIGS. 9A-9C. Here, once the touch screen controller 106 detects strength values of the sense lines that could indicate that a user's hand is gripping the portable housing 101, it defines boundaries about the locations where those strength values indicate parts of the user's hand may be (FIG. 9A).

If a finger leaves a defined boundary (FIG. 9B), and then returns to the defined boundary within a given period of time (FIG. 9C), then a gesture or side gesture (here, a sliding motion) is detected.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a touch screen controller for a touch sensitive display carried by a portable housing configured to:
operate in a high detection threshold mode to determine whether an object is in contact with the touch sensitive display;
operate in a low detection threshold mode to determine whether the object is adjacent to the touch sensitive display, based on lack of detection of the object being in contact with the touch sensitive display; and
determine whether the object is in contact with a peripheral edge of the portable housing based on determination of the object being adjacent to the touch sensitive display, the determination of the object being in contact with a peripheral edge of the portable housing being performed by:
scanning a first subset of sense lines most adjacent to a first side of the touch sensitive display and a second subset of sense lines most adjacent to the first subset of sense lines;
scanning a third subset of sense lines most adjacent to a second side of the touch sensitive display and a fourth subset of sense lines most adjacent to the second subset of sense lines; and
determining that object is in contact with the peripheral edge of the portable housing based upon the first subset of sense lines and the third subset of sense lines each being greater than a threshold while the second subset of sense lines and the fourth subset of sense lines are each less than the threshold, but determining that the object is not in contact with the peripheral edge of the portable housing and is instead hovering over the portable housing based upon the first subset of sense lines and second subset of sense lines each being greater than the threshold or based upon the third subset of sense lines and the fourth subset of sense lines each being greater than the threshold.

2. The electronic device of claim 1, wherein, when operating in the high detection threshold mode, the touch screen controller scans each sense line of the touch sensitive display.

3. The electronic device of claim 1, wherein the first subset of the sense lines of the touch sensitive display includes a pair of sense lines adjacent the first side of the touch sensitive display and excludes other sense lines of the touch sensitive display; and wherein the third subset of the sense lines of the touch sensitive display includes a pair of sense lines adjacent to the second side of the touch sensitive display and excludes other sense lines of the touch sensitive display.

4. The electronic device of claim 1, wherein the touch screen controller determines that the object is hovering above the touch sensitive display based on detection of the object being adjacent to the touch sensitive display but not being adjacent to first and second opposing sides of the touch sensitive display.

5. The electronic device of claim 1, wherein the touch screen controller determines whether the object is adjacent to the touch sensitive display by at least one of:
the strength values from the first subset of sense lines each being greater than a first threshold and the strength values from the second subset of sense lines each being less than a second threshold, the second threshold being less than the first threshold; and
the strength values from the third subset of sense lines each being greater than the first threshold and the strength values for the fourth subset of sense lines each being less than the second threshold.

6. The electronic device of claim 5, wherein the first threshold is predetermined; and wherein the second threshold is defined as a predetermined percentage of a maximum possible strength value for the first subset of sense lines.

7. The electronic device of claim 1, wherein the touch screen controller is further configured to:
set detection boundary areas about each location where the object is in contact with the portable housing;
determine that the object has tapped the portable housing as a function of the object leaving a detection boundary area, returning to the detection boundary area, remaining within the detection boundary area for a given period of time, and then leaving the detection boundary area.

8. The electronic device of claim 1, wherein the touch screen controller is further configured to:
set detection boundary areas about each location where the object is in contact with the portable housing;
determine that the object has tapped the portable housing as a function of an additional portion of the object coming into contact with the portable housing outside of the detection boundary area and then leaving contact with the portable housing, within a given period of time.

9. The electronic device of claim 1, wherein the touch screen controller is further configured to:
set detection boundary areas about each location where the object is in contact with the portable housing;
determine that the object is a user's hand gripping the portable housing as a function of the object remaining within the detection boundary area for at least a threshold period of time.

10. The electronic device of claim 9, wherein the touch screen controller is further configured to:
set detection boundary areas about each location where the object is in contact with the portable housing;
determine that the object has moved in a gesture as a function of a portion of the object leaving one detection boundary area and moving in a predetermined pattern while maintaining contact with the portable housing.

11. The electronic device of claim 9, wherein the touch screen controller is further configured to:
set at least one additional detection boundary area about each additional location where an additional portion of the object comes into contact with the portable housing after the determination that the object is the user's hand gripping the portable housing;
determine that the addition portion of the object is the user's hand gripping the portable housing as a function of the additional portion of the object remaining within the at least one additional detection boundary area for at least an additional threshold period of time.

12. The electronic device of claim 9, further comprising processing circuitry; and wherein the touch screen controller is configured to output to the processing circuitry each location where the object remained within an associated boundary area for at least the threshold period of time as a grip location.

13. An electronic device, comprising:
a portable housing;
a touch sensitive display carried by the portable housing, the touch sensitive display including a plurality of sense lines;
a touch screen controller coupled to the plurality of sense lines and configured to:
  operate in a screen touch detection mode to detect a user's hand being in contact with the touch sensitive display as a function of reading strength values from at least some of the plurality of sense lines;
  wherein, in the screen touch detection mode, the user's hand is detected as being in contact with the touch sensitive display as a function of read strength values being greater than a first threshold;
  operate in a portable housing touch detection mode to detect the user's hand being adjacent to the touch sensitive display, based on lack of detection of the user's hand being in contact with the touch sensitive display and as a function of reading strength values from at least some of the plurality of sense lines;
  where, in the portable housing touch detection mode, the user's hand is detected as being adjacent to the touch sensitive display as a function of read strength values being greater than a second threshold;
  wherein the second threshold is less than the first threshold;
  determine whether the user's hand is in contact with the portable housing by detecting whether the user's hand is adjacent opposite sides of the touch sensitive display, based on detection of the user's hand being adjacent to the touch sensitive display, the determination of the user's hand being in contact with a peripheral edge of the portable housing being performed by:
    scanning a first subset of sense lines most adjacent to a first side of the touch sensitive display and a second subset of sense lines most adjacent to the first subset of sense lines;
    scanning a third subset of sense lines most adjacent to a second side of the touch sensitive display and a fourth subset of sense lines most adjacent to the second subset of sense lines; and
    determining that object is in contact with the peripheral edge of the portable housing based upon acquired strength values from the first subset of sense lines and the third subset of sense lines each being greater than a threshold while acquired strength values from the second subset of sense lines and the fourth subset of sense lines are each less than the threshold, but determining that the object is not in contact with the peripheral edge of the portable housing and is instead hovering over the portable housing based upon the first subset of sense lines and second subset of sense lines each being greater than the threshold or based upon the third subset of sense lines and the fourth subset of sense lines each being greater than the threshold.

14. The electronic device of claim 13, wherein, when operating in the screen touch detection mode, the touch screen controller reads strength values from each sense line of the plurality thereof.

15. The electronic device of claim 14, wherein the first subset of the sense lines includes a pair of sense lines adjacent the first side of the touch sensitive display and excludes other sense lines; and wherein the third subset of the sense lines includes a pair of sense lines adjacent to the second side of the touch sensitive display and excludes other sense lines.

16. The electronic device of claim 13, wherein the touch screen controller determines whether the user's hand is adjacent to opposing sides of the touch sensitive display by at least one of:
  the strength values from the first subset of sense lines each being greater than a first threshold and the strength values from the second subset of sense lines each being less than a second threshold, the second threshold being less than the first threshold;
  the strength values from the third subset of sense lines each being greater than the first threshold and the strength values for the fourth subset of sense lines each being less than the second threshold.

17. The electronic device of claim 16, wherein the first threshold is predetermined; and wherein the second threshold is defined as a predetermined percentage of a maximum possible strength value for the first subset of sense lines.

18. A touch screen controller chip for a touch sensitive display carried by a portable housing, the touch screen controller chip, comprising:
circuitry configured to:
  operate in a high detection threshold mode to determine whether an object is in contact with the touch sensitive display;
  operate in a low detection threshold mode to determine whether the object is adjacent to the touch sensitive display, based on lack of detection of the object being in contact with the touch sensitive display; and
  determine whether the object is in contact with a peripheral edge of the portable housing based on determination of the object being adjacent to the touch sensitive display, the determination of the object being in contact with the peripheral edge of the portable housing being performed by:
    scanning a first subset of sense lines most adjacent to a first side of the touch sensitive display and a second subset of sense lines most adjacent to the first subset of sense lines;
    scanning a third subset of sense lines most adjacent to a second side of the touch sensitive display and a fourth subset of sense lines most adjacent to the second subset of sense lines; and
    determining that object is in contact with the peripheral edge of the portable housing based upon acquired strength values from the first subset of sense lines and the third subset of sense lines each being greater than a threshold while acquired strength values from the second subset of sense lines and the fourth subset of sense lines are each less than the threshold, but determining that the object is not in contact with the peripheral edge of the portable housing and is instead hovering over the portable housing based upon the first subset of sense lines and second subset of sense lines each being greater than the threshold or based upon the third subset of sense lines and the fourth subset of sense lines each being greater than the threshold.

19. The touch screen controller chip of claim 18, wherein, when operating in the high detection threshold mode, the circuitry scans each sense line of the touch sensitive display.

20. The touch screen controller chip of claim 18, wherein the first subset of the sense lines of the touch sensitive display includes a pair of sense lines adjacent the first side of the touch sensitive display and excludes other sense lines of the touch sensitive display; and wherein the third subset of the sense lines of the touch sensitive display includes a pair of sense lines adjacent the second side of the touch sensitive display and excludes other sense lines of the touch sensitive display.

21. The touch screen controller chip of claim 18, wherein the circuitry is further configured to:
   set detection boundary areas about each location where the object is in contact with the portable housing;
   determine that the object is a user's hand gripping the portable housing as a function of the object remaining within the detection boundary area for at least a threshold period of time.

22. A method of operating a touch screen controller for a touch sensitive display carried by a portable housing, the method comprising:
   operating in a high detection threshold mode to determine whether an object is in contact with the touch sensitive display;
   operating in a low detection threshold mode to determine whether the object is adjacent to the touch sensitive display, based on lack of detection of the object being in contact with the touch sensitive display; and
   determining whether the object is in contact with a peripheral edge of the portable housing based on determination of the object being adjacent to the touch sensitive display, the determination of the object being in contact with the peripheral edge of the portable housing being performed by:
      scanning a first subset of sense lines most adjacent to a first side of the touch sensitive display and a second subset of sense lines most adjacent to the first subset of sense lines;
      scanning a third subset of sense lines most adjacent to a second side of the touch sensitive display and a fourth subset of sense lines most adjacent to the second subset of sense lines; and
         determining that object is in contact with the peripheral edge of the portable housing based upon acquired strength values from the first subset of sense lines and the third subset of sense lines each being greater than a threshold while acquired strength values from the second subset of sense lines and the fourth subset of sense lines are each less than the threshold, but determining that the object is not in contact with the peripheral edge of the portable housing and is instead hovering over the portable housing based upon the first subset of sense lines and second subset of sense lines each being greater than the threshold or based upon the third subset of sense lines and the fourth subset of sense lines each being greater than the threshold.

23. The method of claim 22, wherein, when operating in the high detection threshold mode, each sense line of the touch sensitive display is scanned.

24. The method of claim 22, further comprising:
   setting detection boundary areas about each location where the object is in contact with the portable housing; and
   determining that the object has tapped the portable housing as a function of the object leaving a detection boundary area, returning to the detection boundary area, remaining within the detection boundary area for a given period of time, and then leaving the detection boundary area.

25. The method of claim 22, further comprising:
   setting detection boundary areas about each location where the object is in contact with the portable housing; and
   determining that the object has tapped the portable housing as a function of an additional portion of the object coming into contact with the portable housing outside of the detection boundary area and then leaving contact with the portable housing, within a given period of time.

26. The method of claim 22, further comprising:
   setting detection boundary areas about each location where the object is in contact with the portable housing;
   determining that the object is a user's hand gripping the portable housing as a function of the object remaining within the detection boundary area for at least a threshold period of time.

* * * * *